A. D. SHAVER.
RIDING ATTACHMENT FOR HARROWS.
No. 79,604. Patented July 7, 1868.
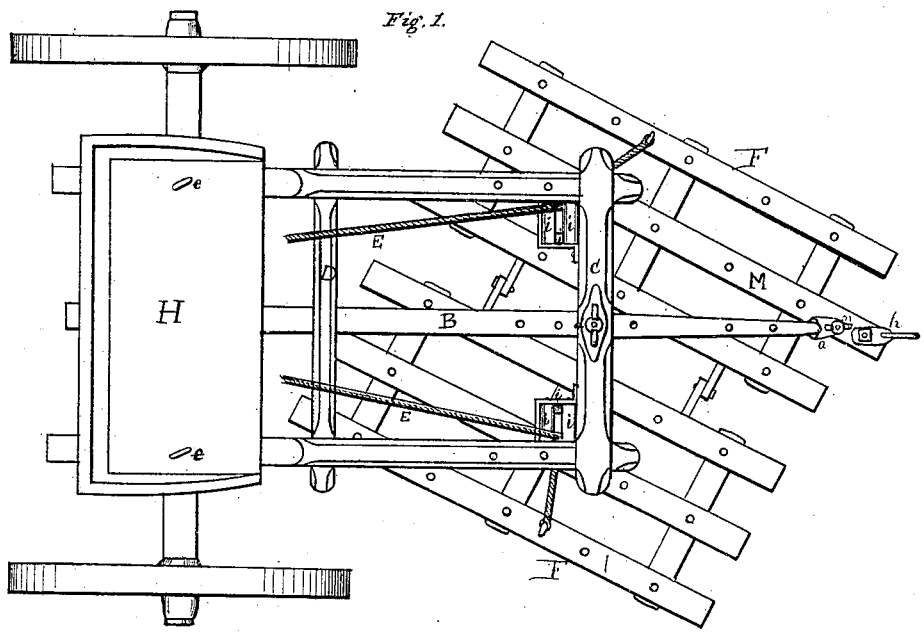
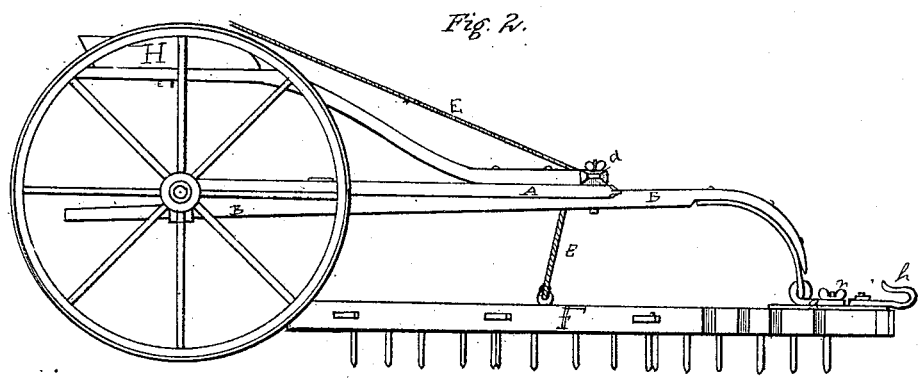

United States Patent Office.

AUSTIN D. SHAVER, OF BELLEVILLE, NEW YORK.

*Letters Patent No. 79,604, dated July 7, 1868.*

IMPROVEMENT IN RIDING-ATTACHMENT TO HARROWS.

The Schedule referred to in these Letters Patent and making part of the same.

TO WHOM IT MAY CONCERN:

Be it known that I, AUSTIN D. SHAVER, of Belleville, in the county of Jefferson, and State of New York, have made new and useful Improvements in Riding-Attachment to Harrows; and I hereby declare the following to be a full and exact description of the same, reference being had to the drawings that accompany and form a part of these specifications.

My invention relates to the method of attaching a sulky to harrows, making it adjustable, so as to accommodate it to different-sized harrows, and by which the bearing on the harrow can be regulated, making it heavy or light, as desired.

Figure 1 is a top view of my harrow, with riding-attachment, showing all parts.

Figure 2 is side elevation, showing the mode of attaching the carriage to the harrow by means of curved pole.

To enable those skilled in the arts to make and operate my invention, I will proceed to describe it.

I make a frame, consisting of sides, A A, and two cross-beams, C and D. This frame I support on an axle and two wheels, as shown in fig. 1.

I have a tongue or pole, B, which has a downward curve at forward end, as shown in fig. 2. This pole I attach to the centre of frame, it running longitudinally, and held in position by loop under the axle and the cross-beam C, and secured by a bolt and thumb-screw, $d$, as shown in figs. 1 and 2.

Bolted to the forward ends of sides of frame A A, and extending back, are two springs, upon which rests the driver s seat H, which is made adjustable by means of having several holes in the springs, and pins, $e\ e$, to hold it in place. By having my seat adjustable, so that I may move it forward or backward, I can change the pressure on the harrow, for, as it is moved one way or the other, the weight is changed; so, also, I add to the pressure, or take therefrom, by having my tongue or pole pierced with several holes near the forward cross-beam C, so that it may also be moved forward or backward, at pleasure.

To the end of my curved pole is attached a swivel-link, $a$, which I secure to one of the harrow-beams, by means of a bolt and thumb-screw, $n$, as shown in figs. 1 and 2. To the same beam, and in front, I attach the draught-hook $h$.

To the outside frames of the harrow I attach two ropes, which pass up between four rollers placed in each corner of the frame, as shown in fig. 1. Four of these rollers, $i\ i\ i\ i$, are placed crosswise the frame, the other four beneath them, and longitudinally, so that the ropes always have friction-rollers against which they rest.

By these ropes E, the driver can raise the harrow and guide it, in a great measure; and as the pole extends some distance forward of the wheels, the harrow can never come in contact in turning about in any manner; so that, by having my pole B and seat H made adjustable, and by the ropes, the driver can put as much weight upon the harrow as he pleases, and guide and regulate the harrow at will. And by having the weight applied wholly to the forward end, I counteract the upward tendency of the harrow caused by the draught of the horses, or other means of draught, as is the common fault.

Having thus fully described my invention, what I claim as new, and desire to secure by Letters Patent, is—

A riding-attachment for harrows, made with adjustable seat H and pole B, curved downward at the forward end, and secured to harrow by swivel-link $a$, and to frame by bolt and thumb-screw $d$, and ropes E, friction-rollers $i\ i\ i\ i$, with counter-rollers beneath, as combined, arranged, and attached, for the use and purpose as specified and herein set forth.

In testimony whereof, I have signed my name to this specification in the presence of two subscribing witnesses.

AUSTIN D. SHAVER.

Witnesses:
   EDM. F. BROWN,
   C. F. WILSON.